United States Patent
Fraser et al.

(10) Patent No.: US 8,433,556 B2
(45) Date of Patent: Apr. 30, 2013

(54) SEMI-SUPERVISED TRAINING FOR STATISTICAL WORD ALIGNMENT

(75) Inventors: Alexander Fraser, Santa Monica, CA (US); Daniel Marcu, Hermosa Beach, CA (US)

(73) Assignee: University of Southern California, Los Angeles, CA (US)

( * ) Notice: Subject to any disclaimer, the term of this patent is extended or adjusted under 35 U.S.C. 154(b) by 1262 days.

(21) Appl. No.: 11/592,450

(22) Filed: Nov. 2, 2006

(65) Prior Publication Data
US 2008/0109209 A1 May 8, 2008

(51) Int. Cl.
*G06F 17/20* (2006.01)
*G06F 17/28* (2006.01)
*G06F 17/27* (2006.01)

(52) U.S. Cl.
USPC .............. 704/4; 704/1; 704/2; 704/5; 704/8; 704/9

(58) Field of Classification Search .............. 704/1–10
See application file for complete search history.

(56) References Cited

U.S. PATENT DOCUMENTS

| | | | |
|---|---|---|---|
| 4,502,128 A | 2/1985 | Okajima et al. | |
| 4,599,691 A | 7/1986 | Sakaki et al. | |
| 4,615,002 A | 9/1986 | Innes | |
| 4,661,924 A | 4/1987 | Okamoto et al. | |
| 4,787,038 A | 11/1988 | Doi et al. | |
| 4,791,587 A | 12/1988 | Doi | |
| 4,800,522 A | 1/1989 | Miyao et al. | |
| 4,814,987 A | 3/1989 | Miyao et al. | |
| 4,942,526 A | 7/1990 | Okajima et al. | |
| 4,980,829 A | 12/1990 | Okajima et al. | |
| 5,020,112 A | 5/1991 | Chou | |
| 5,088,038 A | 2/1992 | Tanaka et al. | |
| 5,091,876 A | 2/1992 | Kumano et al. | |
| 5,146,405 A | 9/1992 | Church | |

(Continued)

FOREIGN PATENT DOCUMENTS

| | | |
|---|---|---|
| EP | 0469884 A2 | 2/1992 |
| EP | 0715265 A2 | 6/1996 |

(Continued)

OTHER PUBLICATIONS

Bannard, C. and Callison-Burch, C. 2005. Paraphrasing with bilingual parallel corpora. In Proceedings of the 43rd Annual Meeting on Association for Computational Linguistics (Ann Arbor, Michigan, Jun. 25-30, 2005). Annual Meeting of the ACL. Association for Computational Linguistics, Morristown, NJ, 597-604. DOI= http://dx.doi.org/10.3115/1219840.*

(Continued)

*Primary Examiner* — Pierre-Louis Desir
*Assistant Examiner* — Matthew Baker
(74) *Attorney, Agent, or Firm* — Carr & Ferrell LLP

(57) ABSTRACT

A system and method for aligning words in parallel segments is provided. A first probability distribution of word alignments within a first corpus comprising unaligned word-level parallel segments according to a model estimate is calculated. The model estimate is modified according to the first probability distribution. One or more sub-models associated with the modified model estimate are discriminatively re-ranked according to word-level annotated parallel segments. A second probability distribution of the word alignments within the first corpus is calculated according to the re-ranked sub-models associated with the modified model estimate.

14 Claims, 4 Drawing Sheets

U.S. PATENT DOCUMENTS

| | | | |
|---|---|---|---|
| 5,167,504 A | 12/1992 | Mann | |
| 5,181,163 A | 1/1993 | Nakajima et al. | |
| 5,212,730 A | 5/1993 | Wheatley et al. | |
| 5,218,537 A | 6/1993 | Hemphill et al. | |
| 5,220,503 A | 6/1993 | Suzuki et al. | |
| 5,267,156 A | 11/1993 | Nomiyama | |
| 5,268,839 A | 12/1993 | Kaji | |
| 5,295,068 A | 3/1994 | Nishino et al. | |
| 5,311,429 A | 5/1994 | Tominaga | |
| 5,387,104 A | 2/1995 | Corder | |
| 5,432,948 A | 7/1995 | Davis et al. | |
| 5,442,546 A | 8/1995 | Kaji et al. | |
| 5,477,450 A | 12/1995 | Takeda et al. | |
| 5,477,451 A * | 12/1995 | Brown et al. | 704/9 |
| 5,495,413 A | 2/1996 | Kutsumi et al. | |
| 5,497,319 A | 3/1996 | Chong et al. | |
| 5,510,981 A | 4/1996 | Berger et al. | |
| 5,528,491 A | 6/1996 | Kuno et al. | |
| 5,535,120 A | 7/1996 | Chong et al. | |
| 5,541,836 A | 7/1996 | Church et al. | |
| 5,541,837 A | 7/1996 | Fushimoto | |
| 5,548,508 A | 8/1996 | Nagami | |
| 5,644,774 A | 7/1997 | Fukumochi et al. | |
| 5,675,815 A | 10/1997 | Yamauchi et al. | |
| 5,687,383 A | 11/1997 | Nakayama et al. | |
| 5,696,980 A | 12/1997 | Brew | |
| 5,724,593 A | 3/1998 | Hargrave, III et al. | |
| 5,752,052 A | 5/1998 | Richardson et al. | |
| 5,754,972 A | 5/1998 | Baker et al. | |
| 5,761,631 A | 6/1998 | Nasukawa | |
| 5,761,689 A | 6/1998 | Rayson et al. | |
| 5,768,603 A * | 6/1998 | Brown et al. | 704/9 |
| 5,779,486 A | 7/1998 | Ho et al. | |
| 5,781,884 A | 7/1998 | Pereira et al. | |
| 5,794,178 A | 8/1998 | Caid et al. | |
| 5,805,832 A * | 9/1998 | Brown et al. | 711/1 |
| 5,806,032 A | 9/1998 | Sproat | |
| 5,819,265 A | 10/1998 | Ravin et al. | |
| 5,826,219 A | 10/1998 | Kutsumi | |
| 5,826,220 A | 10/1998 | Takeda et al. | |
| 5,845,143 A | 12/1998 | Yamauchi et al. | |
| 5,848,385 A | 12/1998 | Poznanski et al. | |
| 5,848,386 A | 12/1998 | Motoyama | |
| 5,855,015 A | 12/1998 | Shoham | |
| 5,864,788 A | 1/1999 | Kutsumi | |
| 5,867,811 A | 2/1999 | O'Donoghue | |
| 5,870,706 A | 2/1999 | Alshawi | |
| 5,893,134 A | 4/1999 | O'Donoghue et al. | |
| 5,903,858 A | 5/1999 | Saraki | |
| 5,907,821 A | 5/1999 | Kaji et al. | |
| 5,909,681 A | 6/1999 | Passera et al. | |
| 5,966,685 A | 10/1999 | Flanagan et al. | |
| 5,983,169 A | 11/1999 | Kozma | |
| 5,987,402 A | 11/1999 | Murata et al. | |
| 5,987,404 A | 11/1999 | Della Pietra et al. | |
| 5,991,710 A | 11/1999 | Papineni et al. | |
| 5,995,922 A | 11/1999 | Penteroudakis et al. | |
| 6,018,617 A | 1/2000 | Sweitzer et al. | |
| 6,031,984 A | 2/2000 | Walser | |
| 6,032,111 A | 2/2000 | Mohri | |
| 6,064,819 A | 5/2000 | Franssen et al. | |
| 6,064,951 A | 5/2000 | Park et al. | |
| 6,073,143 A | 6/2000 | Nishikawa et al. | |
| 6,077,085 A | 6/2000 | Parry et al. | |
| 6,092,034 A | 7/2000 | McCarley et al. | |
| 6,119,077 A | 9/2000 | Shinozaki | |
| 6,131,082 A | 10/2000 | Hargrave, III et al. | |
| 6,161,082 A | 12/2000 | Goldberg et al. | |
| 6,182,014 B1 | 1/2001 | Kenyon et al. | |
| 6,182,027 B1 | 1/2001 | Nasukawa et al. | |
| 6,205,456 B1 | 3/2001 | Nakao | |
| 6,223,150 B1 | 4/2001 | Duan et al. | |
| 6,233,544 B1 | 5/2001 | Alshawi | |
| 6,233,545 B1 | 5/2001 | Datig | |
| 6,233,546 B1 | 5/2001 | Datig | |
| 6,236,958 B1 | 5/2001 | Lange et al. | |
| 6,269,351 B1 | 7/2001 | Black | |
| 6,275,789 B1 | 8/2001 | Moser et al. | |
| 6,278,967 B1 | 8/2001 | Akers et al. | |
| 6,278,969 B1 | 8/2001 | King et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,317,708 B1 | 11/2001 | Witbrock et al. | |
| 6,327,568 B1 | 12/2001 | Joost | |
| 6,330,529 B1 | 12/2001 | Ito | |
| 6,330,530 B1 | 12/2001 | Horiguchi et al. | |
| 6,356,864 B1 | 3/2002 | Foltz et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,470,306 B1 | 10/2002 | Pringle et al. | |
| 6,473,729 B1 | 10/2002 | Gastaldo et al. | |
| 6,480,698 B2 | 11/2002 | Ho et al. | |
| 6,490,549 B1 | 12/2002 | Ulicny et al. | |
| 6,498,921 B1 | 12/2002 | Ho et al. | |
| 6,502,064 B1 | 12/2002 | Miyahira et al. | |
| 6,529,865 B1 | 3/2003 | Duan et al. | |
| 6,535,842 B1 | 3/2003 | Roche et al. | |
| 6,587,844 B1 | 7/2003 | Mohri | |
| 6,647,364 B1 | 11/2003 | Yumura et al. | |
| 6,691,279 B2 | 2/2004 | Yoden et al. | |
| 6,745,161 B1 | 6/2004 | Arnold et al. | |
| 6,757,646 B2 | 6/2004 | Marchisio | |
| 6,778,949 B2 | 8/2004 | Duan et al. | |
| 6,782,356 B1 | 8/2004 | Lopke | |
| 6,810,374 B2 | 10/2004 | Kang | |
| 6,848,080 B1 | 1/2005 | Lee et al. | |
| 6,857,022 B1 | 2/2005 | Scanlan | |
| 6,885,985 B2 | 4/2005 | Hull | |
| 6,901,361 B1 | 5/2005 | Portilla | |
| 6,904,402 B1 | 6/2005 | Wang et al. | |
| 6,952,665 B1 | 10/2005 | Shimomura et al. | |
| 6,983,239 B1 | 1/2006 | Epstein | |
| 6,996,520 B2 | 2/2006 | Levin | |
| 6,999,925 B2 | 2/2006 | Fischer et al. | |
| 7,013,262 B2 | 3/2006 | Tokuda et al. | |
| 7,016,827 B1 | 3/2006 | Ramaswamy et al. | |
| 7,016,977 B1 | 3/2006 | Dunsmoir et al. | |
| 7,024,351 B2 | 4/2006 | Wang | |
| 7,031,911 B2 | 4/2006 | Zhou et al. | |
| 7,050,964 B2 | 5/2006 | Menzes et al. | |
| 7,085,708 B2 | 8/2006 | Manson | |
| 7,103,531 B2 * | 9/2006 | Moore | 704/5 |
| 7,107,204 B1 | 9/2006 | Liu et al. | |
| 7,107,215 B2 | 9/2006 | Ghali | |
| 7,113,903 B1 | 9/2006 | Riccardi et al. | |
| 7,143,036 B2 | 11/2006 | Weise | |
| 7,146,358 B1 | 12/2006 | Gravano et al. | |
| 7,149,688 B2 | 12/2006 | Schalkwyk | |
| 7,174,289 B2 | 2/2007 | Sukehiro | |
| 7,177,792 B2 | 2/2007 | Knight et al. | |
| 7,191,115 B2 | 3/2007 | Moore | |
| 7,197,451 B1 | 3/2007 | Carter et al. | |
| 7,206,736 B2 * | 4/2007 | Moore | 704/2 |
| 7,209,875 B2 | 4/2007 | Quirk et al. | |
| 7,219,051 B2 * | 5/2007 | Moore | 704/5 |
| 7,239,998 B2 | 7/2007 | Xun | |
| 7,249,012 B2 * | 7/2007 | Moore | 704/4 |
| 7,249,013 B2 * | 7/2007 | Al-Onaizan et al. | 704/9 |
| 7,283,950 B2 | 10/2007 | Pournasseh et al. | |
| 7,295,962 B2 | 11/2007 | Marcu | |
| 7,302,392 B1 | 11/2007 | Thenthiruperai et al. | |
| 7,319,949 B2 | 1/2008 | Pinkham | |
| 7,340,388 B2 | 3/2008 | Soricut et al. | |
| 7,346,487 B2 * | 3/2008 | Li | 704/2 |
| 7,346,493 B2 | 3/2008 | Ringger et al. | |
| 7,349,839 B2 * | 3/2008 | Moore | 704/2 |
| 7,356,457 B2 | 4/2008 | Pinkham et al. | |
| 7,373,291 B2 | 5/2008 | Garst | |
| 7,383,542 B2 | 6/2008 | Richardson et al. | |
| 7,389,222 B1 | 6/2008 | Langmead et al. | |
| 7,389,234 B2 | 6/2008 | Schmid et al. | |

| | | | |
|---|---|---|---|
| 7,409,332 B2* | 8/2008 | Moore .............................. 704/2 |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,620,538 B2 | 11/2009 | Marcu et al. |
| 7,624,005 B2 | 11/2009 | Koehn et al. |
| 7,624,020 B2 | 11/2009 | Yamada et al. |
| 7,680,646 B2 | 3/2010 | Lux-Pogodalla et al. |
| 7,689,405 B2 | 3/2010 | Marcu |
| 7,698,124 B2* | 4/2010 | Menezes et al. ................. 704/3 |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,813,918 B2 | 10/2010 | Muslea et al. |
| 7,957,953 B2* | 6/2011 | Moore .............................. 704/2 |
| 7,974,833 B2 | 7/2011 | Soricut et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0078091 A1 | 6/2002 | Vu et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0144832 A1 | 7/2003 | Harris |
| 2003/0176995 A1 | 9/2003 | Sukehiro |
| 2003/0182102 A1 | 9/2003 | Corston-Oliver et al. |
| 2003/0191626 A1* | 10/2003 | Al-Onaizan et al. ............... 704/8 |
| 2003/0217052 A1 | 11/2003 | Rubenczyk et al. |
| 2003/0233222 A1 | 12/2003 | Soricut et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1* | 3/2004 | Moore .......................... 704/254 |
| 2004/0059708 A1 | 3/2004 | Dean et al. |
| 2004/0068411 A1 | 4/2004 | Scanlan |
| 2004/0098247 A1* | 5/2004 | Moore .............................. 704/4 |
| 2004/0111253 A1 | 6/2004 | Luo et al. |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1* | 2/2005 | Koehn .............................. 704/2 |
| 2005/0075858 A1 | 4/2005 | Pournasseh et al. |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1* | 10/2005 | Aue et al. ......................... 704/9 |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0190241 A1 | 8/2006 | Goutte et al. |
| 2007/0016400 A1 | 1/2007 | Soricutt et al. |
| 2007/0033001 A1 | 2/2007 | Muslea et al. |
| 2007/0083357 A1* | 4/2007 | Moore et al. ..................... 704/4 |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0265825 A1* | 11/2007 | Cancedda et al. ................ 704/2 |
| 2007/0265826 A1* | 11/2007 | Chen et al. ...................... 704/2 |
| 2007/0269775 A1 | 11/2007 | Andreev et al. |
| 2007/0294076 A1 | 12/2007 | Shore et al. |
| 2008/0052061 A1 | 2/2008 | Kim et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0326912 A1 | 12/2009 | Ueffing |
| 2010/0017293 A1 | 1/2010 | Lung et al. |
| 2010/0042398 A1 | 2/2010 | Marcu et al. |
| 2010/0174524 A1 | 7/2010 | Koehn |
| 2011/0029300 A1 | 2/2011 | Marcu et al. |
| 2011/0082684 A1 | 4/2011 | Soricut et al. |

FOREIGN PATENT DOCUMENTS

| | | |
|---|---|---|
| EP | 0933712 A2 | 8/1999 |
| EP | 0933712 A3 | 1/2001 |
| JP | 07244666 | 9/1995 |
| JP | 10011447 | 1/1998 |
| JP | 11272672 | 10/1999 |

OTHER PUBLICATIONS

Zhang, Y., Hildebrand, A. S., and Vogel, S. 2006. Distributed language modeling for N-best list re-ranking. In Proceedings of the 2006 Conference on Empirical Methods in Natural Language Processing (Sydney, Australia, Jul. 22-23, 2006). ACL Workshops. Association for Computational Linguistics, Morristown, NJ, 216-223.*

Cheng, P., Pan, Y., Lu, W., and Chien, L. 2004. Creating multilingual translation lexicons with regional variations using web corpora. In Proceedings of the 42nd Annual Meeting on Association for Computational Linguistics (Barcelona, Spain, Jul. 21-26, 2004). Annual Meeting of the ACL. Association for Computational Linguistics, Morristown, NJ, 53.*

Franz Josef Och, Kenji Yamada, Stanford U, Alex Fraser, Daniel Gildea, Viren Jain. A Smorgasbord of Features for Statistical Machine Translation (2004).*

Callison-Burch, C., Talbot, D., and Osborne, M. 2004. Statistical machine translation with word- and sentence-aligned parallel corpora. In Proceedings of the 42nd Annual Meeting on Association for Computational Linguistics (Barcelona, Spain, Jul. 21-26, 2004). Annual Meeting of the ACL. Association for Computational Linguistics, Morristown, NJ, 1.*

Och, F. J. 2003. Minimum error rate training in statistical machine translation. In Proceedings of the 41st Annual Meeting on Association for Computational Linguistics—vol. 1 (Sapporo, Japan, Jul. 7-12, 2003). Annual Meeting of the ACL. Association for Computational Linguistics, Morristown, NJ, 160-167. DOI= http://dx.doi.org/10.3115/1075096.*

Taskar, B., Lacoste-Julien, S., and Klein, D. 2005. A discriminative matching approach to word alignment. In Proceedings of the Conference on Human Language Technology and Empirical Methods in Natural Language Processing (Vancouver, British Columbia, Canada, Oct. 6-8, 2005). Human Language Technology Conference. Association for Computational.*

A Systematic Comparison of Various Statistical Alignment Models. Franz Josef Och, Hermann Ney. Computational Linguistics 2003 29:1, 19-51.*

Rapp, Reinhard, "Identifying Word Translations in Non-Parallel Texts," 1995, 33rd Annual Meeting of the ACL, pp. 320-322. (NPL0164).

Rayner et al.," Hybrid Language Processing in the Spoken Language Translator," IEEE, pp. 107-110. (NPL0165).

Resnik, P. and Smith, A., "The Web as a Parallel Corpus," Sep. 2003, Computational Linguistics, Special Issue on Web as Corpus, vol. 29, Issue 3, pp. 349-380. (NPL0166).

Resnik, P. and Yarowsky, D. "A Perspective on Word Sense Disambiguation Methods and Their Evaluation," 1997, Proceedings of SIGLEX '97, Washington, D.C., pp. 79-86. (NPL0167).

Resnik, Philip, "Mining the Web for Bilingual Text," 1999, 37th Annual Meeting of the ACL, College Park, MD, pp. 527-534. (NPL0168).

Rich, E. and Knight, K., "Artificial Intelligence, Second Edition," 1991, McGraw-Hili Book Company [redacted]. (NPL0169).

Richard et al., "Visiting the Traveling Salesman Problem with Petri nets and application in the glass industry," Feb. 1996, IEEE Emerging Technologies and Factory Automation, pp. 238-242. (NPL0170).

Robin, Jacques, "Revision-Based Generation of Natural Language Summaries Providing Historical Background: Corpus-Based Analysis, Design Implementation and Evaluation," 1994, Ph.D. Thesis, Columbia University, New York. (NPL0171).

Rogati et al., "Resource Selection for Domain-Specific Cross-Lingual IR," ACM 2004, pp. 154-161. (NPL0172).

Ruiqiang, Z. et al., "The NiCT-ATR Statistical Machine Translation System for the IWSLT 2006 Evaluation," submitted to IWSLT, 2006. (NPL0173).

Russell, S. and Norvig, P., "Artificial Intelligence: A Modern Approach," 1995, Prentice-Hall, Inc., New Jersey [redacted—table of contents]. (NPL0174).

Sang, E. and Buchholz, S., "Introduction to the CoNLL-2000 Shared Task: Chunking," 20002, Proc. of CoNLL-2000 and LLL-2000, Lisbon, Portugal, pp. 127-132. (NPL0175).

Schmid, H., and Schulte im Walde, S., "Robust German Noun Chunking With a Probabilistic Context-Free Grammar," 2000, Proc. of the 18th Conference on Computational Linguistics, vol. 2, pp. 726-732. (NPL0176).

Schutze, Hinrich, "Automatic Word Sense Discrimination," 1998, Computational Linguistics, Special Issue on Sense Disambiguation, vol. 24, Issue 1, pp. 97-123. (NPL0177).

Selman et al., "A New Method for Solving Hard Satisfiability Problems," 1992, Proc. of the 10th National Conference on Artificial Intelligence, San Jose, CA, pp. 440-446. (NPL0178).

Kumar, S. and Byrne, W., "Minimum Bayes-Risk Decoding for Statistical Machine Translation." HLTNAACL Conference. Mar. 2004, 8 pages. (NPL0179).

Shapiro, Stuart (ed.), "Encyclopedia of Artificial Intelligence, 2nd edition", vol.D 2,1992, John Wiley & Sons Inc; "Unification" article, K. Knight, pp. 1630-1637. (NPL0180).

Shirai, S., "A Hybrid Rule and Example-based Method for Machine Translation," NTT Communication Science Laboratories, pp. 1-5. (NPL0181).

Sobashima et al., "A Bidirectional Transfer-Driven Machine Translation System for Spoken Dialogues," 1994, Proc. of 15th Conference on Computational Linguistics, vol. 1, pp. 64-68. (NPL0182).

Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164. (NPL0183).

Stalls, B. and Knight, K., "Translating Names and Technical Terms in Arabic Text," 1998, Proc. of the COLING/ACL Workkshop on Computational Approaches to Semitic Language. (NPL0184).

Sumita et al., "A Discourse Structure Analyzer for Japanese Text," 1992, Proc. of the International Conference on Fifth Generation Computer Systems, vol. 2, pp. 1133-1140. (NPL0185).

Sun et al., "Chinese Named Entity Identification Using Class-based Language Model," 2002, Proc. of 19th International Conference on Computational Linguistics, Taipei, Taiwan, vol. 1, pp. 1-7. (NPL0186).

Tanaka, K. and Iwasaki, H. "Extraction of Lexical Translations from Non-Aligned Corpora," Proceedings of COLING 1996 (NPL0187).

Taylor et al., "The Penn Treebank: An Overview," in A. Abeill (ed.), D Treebanks: Building and Using Parsed Corpora, 2003, pp. 5-22. (NPL0190).

Tiedemann, Jorg, "Automatic Construction of Weighted String Similarity Measures," 1999, In Proceedings of the Joint SIGDAT Conference on Emperical Methods in Natural Language Processing and Very Large Corpora. (NPL0191).

Tillman, C. and Xia, F., "A Phrase-Based Unigram Model for Statistical Machine Translation," 2003, Proc. of the North American Chapter of the ACL on Human Language Technology, vol. 2, pp. 106-108. (NPL0192).

Tillmann et al., "A DP based Search Using Monotone Alignments in Statistical Translation," 1997, Proc. of the Annual Meeting of the ACL, pp. 366-372. (NPL0193).

Tomas, J., "Binary Feature Classification for Word Disambiguation in Statistical Machine Translation," Proceedings of the 2nd Int'l. Workshop on Pattern Recognition, 2002, pp. 1-12. (NPL0194).

Uchimoto, K. et al., "Word Translation by Combining Example-based Methods and Machine Learning Models," Natural Language Processing (Shizen Gengo Shori), vol. 10, No. 3, Apr. 2003, pp. 87-114. (NPL0195).

Uchimoto, K. et al., "Word Translation by Combining Example-based Methods and Machine Learning Models," Natural Language Processing (Shizen Gengo Shori), vol. 10, No. 3, Apr. 2003, pp. 87-114. (English Translation) (NPL0196).

Ueffing et al., "Generation of Word Graphs in Statistical Machine Translation," 2002, Proc. of Empirical Methods in Natural Language Processing (EMNLP), pp. 156-163. (NPL0197).

Varga et al, "Parallel Corpora for Medium Density Languages", In Proceedings of RANLP 2005, pp. 590-596 (NPL0198).

Veale, T. and Way, A., "Gaijin: A Bootstrapping, Template-Driven Approach to Example-Based MT," 1997, Proc. of New Methods in Natural Language Processing (NEMPLP97), Sofia, Bulgaria. (NPL0199).

Vogel et al., "The CMU Statistical Machine Translation System," 2003, Machine Translation Summit IX, New Orleans, LA. (NPL0200).

Vogel et al., "The Statistical Translation Module in the Verbmobil System," 2000, Workshop on Multi-Lingual Speech Communication, pp. 69-74. (NPL0201).

Vogel, S. and Ney, H., "Construction of a Hierarchical Translation Memory," 2000, Proc. of Cooling 2000, Saarbrucken, Germany, pp. 1131-1135. (NPL0202).

Wang, Y. and Waibel, A., "Decoding Algorithm in Statistical Machine Translation," 1996, Proc. of the 35th Annual Meeting of the ACL, pp. 366-372. (NPL0204).

Wang, Ye-Yi, "Grammar Inference and Statistical Machine Translation," 1998, Ph.D Thesis, Carnegie Mellon University, Pittsburgh, PA. (NPL0205).

Watanabe et al., "Statistical Machine Translation Based on Hierarchical Phrase Alignment," 2002, 9th International Conference on Theoretical and Methodoligcal Issues in Machin Translation (TMI-2002), Keihanna, Japan, pp. 188-198 (NPL0206).

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316. (NPL0207).

Wu, Dekai, "A Polynomial-Time Algorithm for Statistical Machine Translation," 1996, Proc. of 34th Annual Meeting of the ACL, pp. 152-158. (NPL0208).

Wu, Dekai, "Stochastic Inversion Transduction Grammars and Bilingual Parsing of Parallel Corpora," 1997, Computational Linguistics, vol. 23, Issue 3, pp. 377-403. (NPL0209).

Yamada, K. and Knight, K. "A Syntax-based Statistical Translation Model," D 2001, Proc. of the 39th Annual Meeting of the ACL, pp. 523-530. (NPL0210).

Yamada, K. and Knight, K., "A Decoder for Syntax-based Statistical MT," 2001, Proceedings of the 40th Annual Meeting of the ACL, pp. 303-310. (NPL0211).

Yamada K., "A Syntax-Based Statistical Translation Model," 2002 PhD Dissertation, pp. 1-141. (NPL0212).

Yamamoto et al., "A Comparative Study on Translation Units for Bilingual Lexicon Extraction," 2001, Japan Academic Association for Copyright Clearance, Tokyo, Japan. (NPL0213).

Yamamoto et al, "Acquisition of Phrase-level Bilingual Correspondence using Dependency Structure" In Proceedings of COLING-2000, pp. 933-939 (NPL0214).

Yarowsky, David, "Unsupervised Word Sense Disambiguation Rivaling Supervised Methods," 1995, 33rd Annual Meeting of the ACL, pp. 189-196. (NPL0215).

Zhang et al., "Synchronous Binarization for Machine Translations," Jun. 4-9, 2006, in Proc. of the Human Language Technology Conference of the North American Chapter of the ACL, pp. 256-263. (NPL0217).

Koehn, P. and Knight, K., "Knowledge Sources for Word-Level Translation Models," 2001, Conference on Empirical Methods in Natural Language Processing. (NPL0111).

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727. (NPL0112).

Kupiec, Julian, "An Algorithm for Finding Noun Phrase Correspondecnes in Bilingual Corpora," In Proceedings of the 31st Annual Meeting of the ACL, 1993, pp. 17-22. (NPL0113).

Kurohashi, S. and Nagao, M., "Automatic Detection of Discourse Structure by Checking Surface Information in Sentences," 1994, Proc. of COL-LING '94, vol. 2, pp. 1123-1127. (NPL0114).

Langkilde, I. and Knight, K., "Generation that Exploits Corpus-Based Statistical Knowledge," 1998, Proc. of the COLING-ACL, pp. 704-710. (NPL0115).

Langkilde, I. and Knight, K., "The Practical Value of N-Grams in Generation," 1998, Proc. of the 9th International Natural Language Generation Workshop, pp. 248-255. (NPL0116).

Langkilde, Irene, "Forest-Based Statistical Sentence Generation," 2000, Proc. of the 1st Conference on North American chapter of the ACL, Seattle, WA, pp. 170-177. (NPL0117).

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California. (NPL0118).

Langkilde-Geary, Irene, "An Empirical Verification of Coverage and Correctness for a General-Purpose Sentence Generator," 1998, Proc. 2nd Int'l Natural Language Generation Conference. (NPL0119).

Lee-Y.S., "Neural Network Approach to Adaptive Learning: with an Application to Chinese Homophone Disambiguation," IEEE pp. 1521-1526. (NPL0120).

Lita, L. et al., "tRuEcasing," Proceedings of the 41st Annual Meeting of the Assoc. for Computational Linguistics (In . Hinrichs, E. and Roth, D.-editors), pp. 152-159. (NPL0121).

Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4. (NPL0122).

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158. (NPL0123).

Manning, C. and Schutze, H., "Foundations of Statistical Natural Language Processing," 2000, The MIT Press, Cambridge, MA [redacted]. (NPL0125).

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139. (NPL0126).

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074. (NPL0127).

Marcu, Daniel, "Discourse trees are good indicators of importance in text," 1999, Advances in Automatic Text Summarization, The MIT Press, Cambridge, MA. (NPL0128).

Marcu, Daniel, "Instructions for Manually Annotating the Discourse Structures of Texts," 1999, Discourse Annotation, pp. 1-49. (NPL0129).

Marcu, Daniel, "The Rhetorical Parsing of Natural Language Texts," 1997, Proceedings of ACLIEACL '97, pp. 96-103. (NPL0130).

Marcu, Daniel, "The Rhetorical Parsing, Summarization, and Generation of Natural Language Texts," 1997, Ph.D. Thesis, Graduate Department of Computer Science, University of Toronto. (NPL0131).

Marcu, Daniel, "Towards a Unified Approach to Memory- and Statistical-Based Machine Translation," 2001, Proc. of the 39th Annual Meeting of the ACL, pp. 378-385. (NPL0132).

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191. (NPL0133).

McDEVITT, K. et al., "Designing of a Community-based Translation Center," Technical Report TR-03-30, Computer Science, Virginia Tech, © 2003, pp. 1-8. (NPL0134).

Melamed, I. Dan, "A Word-to-Word Model of Translational Equivalence," 1997, Proc. of the 35th Annual Meeting of the ACL, Madrid, Spain, pp. 490-497. (NPL0135).

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198. (NPL0136).

Melamed, I. Dan, "Empirical Methods for Exploiting Parallel Texts," 2001, MIT Press, Cambridge, MA [table of contents]. (NPL0137).

Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314. (NPL0138).

Metze, F. et al., "The NESPOLE! Speech-to-Speech Translation System," Proc. of the HLT 2002, 2nd Int'l Conf. on Human Language Technology (San Francisco, CA), © 2002, pp. 378-383. (NPL0139).

Mikheev et al., "Named Entity Recognition without Gazeteers," 1999, Proc. of European Chapter of the ACL, Bergen, Norway, pp. 1-8. (NPL0140).

Miike et al., "A full-text retrieval system with a dynamic abstract generation function," 1994, Proceedings of SI-GIR '94, pp. 152-161. (NPL0141).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316. (NPL0142).

Mohri, Mehryar, "Regular Approximation of Context Free Grammars Through Transformation", 2000, pp. 251-261, "Robustness in Language and Speech Technology", Chapter 9, Kluwer Academic Publishers. (NPL0143).

Monasson et al., "Determining computational complexity from characteristic 'phase transitions'," Jul. 1999, Nature Magazine, vol. 400, pp. 133-137. (NPL0144).

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91. (NPL0145).

Nagao, K. et al., "Semantic Annotation and Transcoding: Making Web Content More Accessible," IEEE Multimedia, vol. 8, Issue 2 Apr.-Jun. 2001, pp. 69-81. (NPL0146).

Nederhof, M. and Satta, G., "Idl-Expressions: A Formalism for Representing and Parsing Finite Languages in Natural Language Processing," 2004, Journal of Artificial Intelligence Research, vol. 21, pp. 281-287. (NPL0147).

Niessen,S. and Ney, H, "Toward hierarchical models for statistical machine translation of inflected languages," 2001, Data-Driven Machine Translation Workshop, Toulouse, France, pp. 47-54. (NPL0148).

Norvig, Peter, "Techniques for Automatic Memoization with Applications to Context-Free Parsing", Compuational . Linguistics,1991, pgs. 91-98, vol. 17, No. 1 (NPL0149).

Och et al., "Improved Alignment Models for Statistical Machine Translation," 1999, Proc. of the Joint Conf. of Empirical Methods in Natural Language Processing and Very Large Corpora, pp. 20-28. (NPL0150).

Och, F. and Ney, H, "Improved Statistical Alignment Models," 2000, 38th Annual Meeting of the ACL, Hong Kong, pp. 440-447. (NPL0153).

Och, F. and Ney, H., "Discriminative Training and Maximum Entropy Models for Statistical Machine Translation," 2002, Proc. of the 40th Annual Meeting of the ACL, Philadelphia, PA, pp. 295-302. (NPL0154).

Papineni et al., "Bleu: a Method for Automatic Evaluation of Machine Translation," 2001, IBM Research Report, RC22176(WQ102-022). (NPL0156).

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324. (NPL0158).

Petrov et al., "Learning Accurate, Compact and Interpretable Tree Annotation," Jun. 4-9, 2006, in Proc. of the Human Language Technology Conference of the North American Chapter of the ACL, pp. 433-440. (NPL0159).

Pla et al., "Tagging and Chunking with Bigrams," 2000, Proc. of the 18th Conference on Computational Linguistics, vol. 2, pp. 614-620. (NPL0160).

Qun, Liu, "A Chinese-English Machine Translation System Based on Micro-Engine Architecture," An Int'l Conference on Translation and Information Technology, Hong Kong, Dec. 2000, pp. 1-10. (NPL0161).

Rapp, Reinhard, Automatic Identification of Word Translations from Unrelated English and German Corpora, 1999, 37th Annual Meeting of the ACL, pp. 519-526. (NPL0163).

Elhadad, Michael, "FUF: the Universal Unifier User Manual Version 5.2", 1993, Department of Computer Science, Ben Gurion University, Beer Sheva, Israel. (NPL0054).

Elhadad, Michael, "Using Argumentation to Control Lexical Choice: A Functional Unification Implementation", 1992, Ph.D. Thesis, Graduate School of Arts and Sciences, Columbia University. (NPL0055).

Elhadad. M., and Robin, J., "Surge: a Comprehensive Plug-in Syntactic Realization Component for Text Generation", 1999 (available at http://www.cs.bgu.ac.il/-elhadad/pub.html), (NPL0056).

Fleming, Michael et al., "Mixed-Initiative Translation of Web Pages," AMTA 2000, LNAI 1934, Springer-Verlag, Berlin, Germany, 2000, pp. 25-29. (NPL0057).

Franz Josef Och, Hermann Ney: "Improved Statistical Alignment Models" ACLOO:Proc. of the 38th Annual Meeting of the Association for Computation Lingustics, 'Online! Oct. 2-6, 2000, pp. 440-447, XP002279144 Hong Kong, China Retreived from the Internet: <URL:http://www-i6-informatik.rwth-aachen.de/Colleagues/och/ACLOO.ps> 'retrieved on May 6, 2004! abstract (NPL0058)

Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001. (NPL0059).

Fung et al, "Mining Very-non parallel corpora: Parallel sentence and lexicon extractioin via bootstrapping and EM", In EMNLP 2004 (NPL0060).

Fung, P. and Yee, L., "An IR Approach for Translating New Words from Nonparallel, Comparable Texts", 1998, 36th Annual Meeting of the ACL, 17th International Conference on Computational Linguistics, pp. 414-420. (NPL0061).

Fung, Pascale, "Compiling Bilingual Lexicon Entries From a Non-Parallel English-Chinese Corpus", 1995, Proc. of the Third Workshop on Very Large Corpora, Boston, MA, pp. 173-183. (NPL0062).

Gale, W. and Church, K., "A Program for Aligning Sentences in Bilingual Corpora," 1991, 29th Annual Meeting of the ACL, pp. 177-183. (NPL0063).

Gale, W. and Church, K., "A Program for Aligning Sentences in Bilingual Corpora," 1993, Computational . Linguisitcs, vol. 19, No. 1, pp. 177-184 (NPL0064).

Galley et al., "Scalable Inference and Training of Context-Rich Syntactic Translation Models," Jul. 2006, in Proc. of the 21st International Conference on Computational Linguistics, pp. 961-968. (NPL0065).

Galley et al., "What's in a translation rule?", 2004, in Proc. of HLT/NAACL '04, pp. 1-8. (NPL0066).

Gaussier et al, "A Geometric View on Bilingual Lexicon Extraction from Comparable Corpora", In Proceedings of ACL Jul. 2004, (NPL0067).

Germann et al., "Fast Decoding and Optimal Decoding for Machine Translation", 2001, Proc. of the 39th Annual Meeting of the ACL, Toulouse, France, pp. 228-235. (NPL0068).

Germann, Ulrich: "Building a Statistical Machine Translation System from Scratch: How Much Bang for the Buck Can We Expect?" Proc. of the Data-Driven MT Workshop of ACL-01, Toulouse, France, 2001. (NPL0069).

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc for Computational Linguistics, Morristown, NJ, 80-87. DOI=http://dx.doi.org/10.3115/1075096.1075107. (NPL0070).

Grefenstette, Gregory, "The World Wide Web as a Resource for Example-Based Machine Translation Tasks", 1999, Translating and the Computer 21, Proc. of the 21 st International Cant. on Translating and the Computer. London, UK, 12 pp. (NPL0071).

Grossi et al, "Suffix Trees and their applications in string algorithms", In. Proceedings of the 1st South American Workshop on String Processing, Sep. 1993, pp. 57-76 (NPL0072).

Gupta et al., "Kelips: Building an Efficient and Stable P2P DHT thorough Increased Memory and Background Overhead," 2003 IPTPS, LNCS 2735, pp. 160-169. (NPL0073).

Habash, Nizar, "The Use of a Structural N-gram Language Model in Generation-Heavy Hybrid Machine Translation," University of Maryland, Univ. Institute for Advance Computer Studies, Sep. 8, 2004. (NPL0074).

Hatzivassiloglou, V. et al., "Unification-Based Glossing",. 1995, Proc. of the International Joint Conference on Artificial Intelligence, pp. 1382-1389. (NPL0075).

Huang et al., "Relabeling Syntax Trees to Improve Syntax-Based Machine Translation Quality," Jun. 4-9 2006, in Proc. of the Human Language Technology Conference of the North Americna Chapter of the ACL, pp. 240-247. (NPL0076).

Ide, N. and Veronis, J., "Introduction to the Special Issue on Word Sense Disambiguation: The State of the Art", Mar. 1998, Computational Linguistics, vol. 24, Issue 1, pp. 2-40. (NPL0077).

Ikel, D., Schwartz, R., and Weischedei, R., "An Algorithm that learns What's in a Name," Machine Learning 34, 211-231 (1999). (NPL0078).

Imamura et al., "Feedback Cleaning of Machine Translation Rules Using Automatic Evaluation," 2003 Computational Linguistics, pp. 447-454. (NPL0079).

Imamura, Kenji, "Hierarchical Phrase Alignment Harmonized with Parsing", 2001, in Proc. of NLPRS, Tokyo. (NPL0080).

Jelinek, F., "Fast Sequential Decoding Algorithm Using a Stack", Nov. 1969, IBM J. Res. Develop., vol. 13, No. 6, pp. 675-685. (NPL0082).

Jones, K. Sparck, "Experiments in Relevance Weighting of Search Terms", 1979, Information Processing & Management, vol. 15, Pergamon Press Ltd., UK, pp. 133-144. (NPL0083).

Klein et al., "Accurate Unlexicalized Parsing," Jul. 2003m, in Proc. of the 41st Annual Meeting of the ACL, pp. 423-430. (NPL0087).

Knight et al., "Integrating Knowledge Bases and Statistics in MT," 1994, Proc. of the Conference of the Association for Machine Translation in the Americas. (NPL0088).

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396. (NPL0089).

Knight, K. and Al-Onaizan, Y., "A Primer on Finite-State Software for Natural Language Processing", 1999 (available at http://www.isi.edu/licensed-sw/carmel). (NPL0091).

Knight, K. and Al-Onaizan, Y., "Translation with Finite -State Devices," Proceedings of the 4th AMTA Conference, 1998. (NPL0092).

Knight, K. and Chander, I., "Automated Postediting of Documents,"1994, Proc. of the 12th Conference on Artificial Intelligence, pp. 779-784. (NPL0093).

Knight, K. and Graehl, J., "Machine Transliteration", 1997, Proc. of the ACL-97, Madrid, Spain, pp. 128-135. (NPL0094).

Knight, K. and Hatzivassiloglou, V., "Two-Level, Many-Paths Generation," D 1995, Proc. of the 33rd Annual Conference of the ACL, pp. 252-260. (NPL0095).

Knight, K. and Luk, S., "Building a Large-Scale Knowledge Base for Machine Translation," 1994, Proc. of the 12th Conference on Artificial Intelligence, pp. 773-778. (NPL0096).

Knight, K. and Marcu, D., "Statistics-Based Summarization—Step One: Sentence Compression," 2000, American Association for Artificial Intelligence Conference, pp. 703-710. (NPL0097).

Knight, K. and Yamada, K., "A Computational Approach to Deciphering Unknown Scripts," 1999, Proc. of the ACL Workshop on Unsupervised Learning in Natural Language Processing. (NPL0098).

Knight, Kevin, "A Statistical MT Tutorial Workbook," 1999, JHU Summer Workshop (available at http://www.isi.edu/natural-language/mUwkbk.rtf). (NPL0101).

Knight, Kevin, "Automating Knowledge Acquisition for Machine Translation," 1997, AI Magazine 18(4). (NPL0102).

Knight, Kevin, "Connectionist Ideas and Algorithms," Nov. 1990, Communications of the ACM, vol. 33, No. 11, pp. 59-74. (NPL0103).

Knight, Kevin, "Decoding Complexity in Word-Replacement Translation Models", 1999, Computational Linguistics, 25(4). (NPL0104).

Knight, Kevin, "Integrating Knowledge Acquisition and Language Acquisition", May 1992, Journal of Applied Intelligence, vol. 1, No. 4. (NPL0105).

Knight, Kevin, "Learning Word Meanings by Instruction,"1996, Proc. of the D National Conference on Artificial Intelligence, vol. 1, pp. 447-454. (NPL0106).

Knight, Kevin, "Unification: A Multidisciplinary Survey," 1989, ACM Computing Surveys, vol. 21, No. 1. (NPL0107).

Koehn, Philipp, "Noun Phrase Translation," A PhD Dissertation for the University of Southern California, pp. xiii, 23, 25-57, 72-81, Dec. 2003. (NPL0108).

Koehn, P. and Knight, K., "ChunkMT: Statistical Machine Translation with Richer Linguistic Knowledge," Apr. 2002, Information Sciences Institution. (NPL0109).

Koehn, P. and Knight, K., "Estimating Word Translation Probabilities from Unrelated Monolingual Corpora Using the EM Algorithm," 2000, Proc. of the 17th meeting of the AAAI. (NPL0110).

Abney, Steven P., "Parsing by Chunks," 1991, Principle-Based Parsing: Computation and Psycholinguistics, vol. 44,pp. 257-279. (NPL0001).

Agbago, A., et al., "True-casing for the Portage System," In Recent Advances in Natural Language Processing (Borovets, Bulgaria), Sep. 21-23, 2005, pp. 21-24. (NPL0002).

Al-Onaizan et al., "Statistical Machine Translation," 1999, JHU Summer Tech Workshop, Final Report, pp. 1-42. (NPL0003).

Al-Onaizan et al., "Translating with Scarce Resources," 2000, 17th National Conference of the American Association for Artificial Intelligence, Austin, TX, pp. 672-678. (NPL0004).

Al-Onaizan, Y. and Knight K., "Machine Transliteration of Names in Arabic Text,"Proceedings of ACL Workshop on Computational Approaches to Semitic Languages. Philadelphia, 2002. (NPL0006).

Al-Onaizan, Y. and Knight, K., "Named Entity Translation: Extended Abstract", 2002, Proceedings of HLT-02, San Diego, CA. (NPL0007).

Al-Onaizan, Y. and Knight, K., "Translating Named Entities Using Monolingual and Bilingual Resources," 2002, Proc. of the 40th Annual Meeting of the ACL, pp. 400-408. (NPL0008).

Alshawi et al., "Learning Dependency Translation Models as Collections of Finite-State Head Transducers," 2000, Computational Linguistics, vol. 26, pp. 45-60. (NPL0010).

Alshawi, Hiyan, "Head Automata for Speech Translation", Proceedings of the ICSLP 96, 1996, Philadelphia, Pennslyvania. (NPL0011).

Ambati, V., "Dependency Structure Trees in Syntax Based Machine Translation," Spring 2008 Report <http://www.cs.cmu.edu/—vamshi/publications/DependencyMT_report.pdf>, pp. 1-8. (NPL0012).

Arbabi et al., "Algorithms for Arabic name transliteration," Mar. 1994, IBM Journal of Research and Development, vol. 38, Issue 2, pp. 183-194. (NPL0013).

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41. (NPL0014).

Ballesteros, L. et al., "Phrasal Translation and Query Expansion Techniques for Cross-Language Information," SIGIR 97, Philadelphia, PA, © 1997, pp. 84-91. (NPL0015).

Bangalore, S. and Rambow, O., "Evaluation Metrics for Generation," 2000, Proc. of the 1st International Natural Language Generation Conf., vol. 14, pp. 1-8. (NPL0016).

Bangalore, S. and Rambow, O., "Using TAGs, a Tree Model, and a Language Model for Generation," May 2000, Workshop TAG+5, Paris. (NPL0017).

Bangalore, S. and Rambow, O., "Corpus-Based Lexical Choice in Natural Language Generation," 2000, Proc. of the 38th Annual ACL, Hong Kong, pp. 464-471. (NPL0018).

Bangalore, S. and Rambow, O., "Exploiting a Probabilistic Hierarchical Model for Generation," 2000, Proc. of 18th conf. on Computational Linguistics, vol. 1, pp. 42-48. (NPL0019).

Barnett et al., "Knowledge and Natural Language Processing," Aug. 1990, Communications of the ACM, vol. 33, Issue 8, pp. 50-71. (NPL0021).

Baum, Leonard, "An Inequality and Associated Maximization Technique in Statistical Estimation for Probabilistic Functions of Markov Processes", 1972, Inequalities 3:1-8. (NPL0022).

Berhe, G. et al., "Modeling Service-baed Multimedia Content Adaptation in Pervasive Computing," CF '04 (Ischia, Italy) Apr. 14-16, 2004, pp. 60-69. (NPL0023).

Boitet, C. et al., "Main Research Issues in Building Web Services," Proc. of the 6th Symposium on Natural Language Processing, Human and Computer Processing of Language and Speech, © 2005, pp. 1-11. (NPL0025).

Brants, Thorsten, "TnT—A Statistical Part-of-Speech Tagger," 2000, Proc. of the 6th Applied Natural Language Processing Conference, Seattle. (NPL0026).

Brill, Eric, "Transformation-Based Error-Driven Learning and Natural Language Processing: A Case Study in Part of Speech Tagging", 1995, Assocation for Computational Linguistics, vol. 21, No. 4, pp. 1-37 (NPL0027).

Brill, Eric. "Transformation-Based Error-Driven Learning and Natural Language Processing: A Case Study in Part of Speech Tagging",1995, Computational Linguistics, vol. 21, No. 4, pp. 543-565. (NPL0028).

Brown et al., "A Statistical Approach to Machine Translation," Jun. 1990, Computational Linguistics, vol. 16, No. 2, pp. 79-85. (NPL0029).

Brown et al., "Word-Sense Disambiguation Using Statistical Methods," 1991, Proc. of 29th Annual ACL, pp. 264-270. (NPL0030).

Brown et al., "The Mathematics of Statistical Machine Translation: Parameter D Estimation," 1993, Computational Linguistics, vol. 19, Issue 2, pp. 263-311. (NPL0031).

Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118. (NPL0032).

Callan et al., "TREC and TIPSTER Experiments with Inquery," 1994, Information Processing and Management, vol. 31, Issue 3, pp. 327-343. (NPL0033).

Carl, Michael. "A Constructivist Approach to Machine Translation," 1998, New Methods of Language Processing and Computational Natural Language Learning, pp. 247-256. (NPL0035).

Chen, K. and Chen, H., "Machine Translation: An Integrated Approach," 1995, Proc. of 6th Int'l Cont. on Theoretical and Methodological Issue in MT, pp. 287-294. (NPL0036).

Cheung et al., "Sentence Alignment in Parallel, Comparable, and Quasi-comparable Corpora", In Proceedings of LREC, 2004, pp. 30-33 (NPL0038).

Chinchor, Nancy, "MUC-7 Named Entity Task Definition," 1997, Version 3.5. (NPL0039).

Clarkson, P. and Rosenfeld, R., "Statistical Language Modeling Using the CMU-Cambridge Toolkit", 1997, Proc. ESCA Eurospeech, Rhodes, Greece, pp. 2707-2710. (NPL0040).

Cohen et al., "Spectral Bloom Filters," SIGMOD 2003, Jun. 9-12, 2003, ACM pp. 241-252 (NPL0041).

Cohen, "Hardware-Assisted Algorithm for Full-text Large-dictionary String Matching Using n-gram Hashing," 1998, Information Processing and Management, vol. 34, No. 4, pp. 443-464. (NPL0042).

Cohen, Yossi, "Interpreter for FUF," (available at ftp:/ftp.cs.bgu.ac.il/pUb/people/elhadad/fuf-life.lf). (NPL0043).

Corston-Oliver, Simon, "Beyond String Matching and Cue Phrases: Improving Efficiency and Coverage in Discourse Analysis", 1998, The AAAI Spring Symposium on Intelligent Text Summarization, pp. 9-15. (NPL0044).

Covington, "An Algorithm to Align Words for Historical Comparison", Computational Linguistics, 1996, 22(4), pp. 481-496 (NPL0045).

Dagan, I. and Itai, A., "Word Sense Disambiguation Using a Second Language Monolingual Corpus", 1994, Association for Computational Linguistics, vol. 20, No. 4, pp. 563-596. (NPL0046).

Dempster et al., "Maximum Likelihood from Incomplete Data via the Em Algorithm", 1977, Journal of the Royal Statistical Society, vol. 39, No. 1, pp. 1-38. (NPL0047).

Diab, M. and Finch, S., "A Statistical Word-Level Translation Model for Comparable Corpora," 2000, In Proc.of the Conference on Content Based Multimedia Information Access (RIAO). (NPL0048).

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9. (NPL0049).

Eisner, Jason,"Learning Non-Isomorphic Tree Mappings for Machine Translation," 2003, in Proc. of the 41st Meeting of the ACL, pp. 205-208. (NPL0050).

Elhadad et al., "Floating Constraints in Lexical Choice", 1996, ACL, 23(2): 195-239. (NPL0051).

Elhadad, M. and Robin, J., "An Overview of Surge: A Reusable Comprehensive Syntactic Realization Component," 1996, Technical Report 96-03, Department of Mathematics and Computer Science, Ben Gurion University, Beer Sheva, Israel. (NPL0052).

Elhadad, M. and Robin, J., "Controlling Content Realization with Functional Unification Grammars", 1992, Aspects of Automated Natural Language Generation, Dale et al. (eds)., Springer Verlag, pp. 89-104. (NPL0053).

"Patent Cooperation Treaty International Preliminary Report on Patentability and The Writen Opinion, International application No. PCT/US2008/004296, Oct. 6, 2009, 5 pgs. (NPL0219)".

Document, Wikipedia.com, web.archive.org (Feb. 24, 2004) <http://web.archive.org/web/20040222202831 /http://en.wikipedia.org/wikiiDocument>, Feb. 24, 2004 (NPL0220).

Identifying, Dictionary.com, wayback.archive.org (Feb. 28, 2007) <http://wayback.archive.org/web/200501 01OOOOOO*/http:////dictionary.reference.com//browse//identifying>, Feb 28,2005 <http://web.archive.org/web/20070228150533/http://dictionary.reference.com/browse/identifying> (NPL0221).

Koehn, P. et al. "Statistical Phrase-Based Translation" Proceedings from HLT-NAACL 2003 Main Papers, pp. 48-54 Edmonton, May-Jun. 2003. (NPL0222).

Abney, S.P., "Stochastic Attribute Value Grammars", Association for Computational Linguistics, 1997, pp. 597-618 (NPL0223).

Tillman, C., et al, "Word Reordering and a Dynamic Programming Beam Search Algorithm for Statistical Machine Translation" <URL: http://acl.ldc.upenn.edu/J/J03/J03-1005.pdf> (NPL0225).

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>(NPL0224).

Wang, W., et al., "Capitalizing Machine Translation" In HLT-NAACL '06 Proceedings Jun. 2006. <http://www.isi.edu/natural-language/mt/hlt-naacl-06-wang.pdf> (NPL0226).

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>(NPL0227).

"Bangalore, S. and Rambow, O., ""Using TAGs, a Tree Model, and a Language Model for Generation,"" May 2000,Workshop TAG+5, Paris. (NPL0017)".

"Bangalore, S. and Rambow, O.,"'Using TAGs, a Tree Model, and a Language Model for Generation,'"May 2000,Workshop TAG+5, Paris. (NPL0017)".

Gale, W. and Church, K., "A Program for Aligning Sentences in Bilingual Corpora," 1993, Computational Linguisitcs, vol. 19, No. 1, pp. 75-102 (NPL0064).

Niessen et al, "Statistical machine translation with scarce resources using morphosyntactic information", Jun. 2004, Computational Linguistics, vol. 30, issue 2, pp. 181-204.

* cited by examiner

SEMI-SUPERVISED TRAINING FOR STATISTICAL WORD ALIGNMENT

GOVERNMENT INTERESTS

The research and development described in this application were supported by the GALE program of the Defense Advanced Research Projects Agency (DARPA), Contract No. HR0011-06-C-0022. This invention was made with government support under Contract No. N66001-00-1-8914 awarded by the Space and Naval Warfare Systems Command. The U.S. government has certain rights in the claimed inventions.

BACKGROUND OF THE INVENTION

1. Field of the Invention

The present invention relates generally to statistical machine translation, and more particularly to systems and methods for statistical word alignment.

2. Description of Related Art

Word alignment is used in statistical machine translation (SMT) to generate improved translations of documents in two or more foreign languages. SMT may align sentences to extract parallel sentences from parallel documents. After determining sentence alignments, SMT typically includes further aligning words or fragments of the sentences. Conventionally, word alignment in SMT is performed to determine whether a specific word or phrase in one language (e.g., English) corresponds to a specific word or phrase in another language (e.g., French). More specifically, word alignment is a process in which a large collection of parallel documents is used to automatically identify word-to-word or word-to-phrase correspondences.

The Expectation-Maximization (E-M) algorithm is commonly used to perform a word alignment in SMT. In the expectation step of the E-M algorithm, the hypothetical dictionary is used to induce word alignments in a large corpus containing millions of sentences. Based on the induced word alignments, the hypothetical dictionary is modified in the maximization step. The modified dictionary is then used to induce better word alignments by repeating the expectation step. This process is repeated as needed until the hypothetical dictionary remains substantially unmodified from cycle to cycle.

More recently, SMT performs an additional step after the E-M Algorithm is completed. The additional step uses a small corpus comprising manual annotations to indicate word alignments. The additional step estimates another dictionary based on the small corpus and combines this dictionary with the hypothetical dictionary generated by the E-M Algorithm. The combined dictionary is then used to correct word alignments in the large corpus in one final step. However, further improvements to increase the accuracy of SMT are still desired by users of SMT.

SUMMARY OF THE INVENTION

The present invention provides a system and method for aligning words in parallel segments. According to one method, a first probability distribution of word alignments within a first corpus comprising unaligned parallel segments according to a model estimate is calculated. The model estimate used to generate the word alignments is modified according to the first probability distribution of the word alignments. One or more sub-models associated with the modified model estimate are discriminatively re-ranked according to word-level annotated parallel segments. A second probability distribution of the word alignments within the first corpus is calculated according to the re-ranked sub-models associated with the modified model estimate.

DETAILED DESCRIPTION

A system and method for word alignment in statistical machine translation (SMT) is provided. The system and method compares parallel segments to produce word alignments indicating a translational correspondence between the words in each of the parallel segments. Segments may comprise parallel text of any length such as documents, sections of documents, paragraphs, sentences, or sentence fragments.

A probability distribution of word alignments in a first corpus of parallel segments may be calculated according to a first model estimate to create a modified model estimate. The modified model estimate may comprise an N-best list where "N" is a constant indicating the number of sub-models comprising the list. The N-best list comprises a list of the top N hypothesized word alignments according to the model estimate for each parallel segment pair. The N-best list may be used to approximate of the full probability distribution of word alignments for these segment pairs according to the model estimate.

A second N-best list based on word alignments in annotated parallel documents may be used to discriminatively re-weight or re-rank one or more sub-models within the modified model estimate. If the N-best list associated with the modified model estimate contains sub-models that are different from an N-best list associated with the first model estimate, the word alignments have not converged. A second probability distribution within the first corpus may be calculated according to the modified model estimate to generate a third model estimate.

Figure 1:
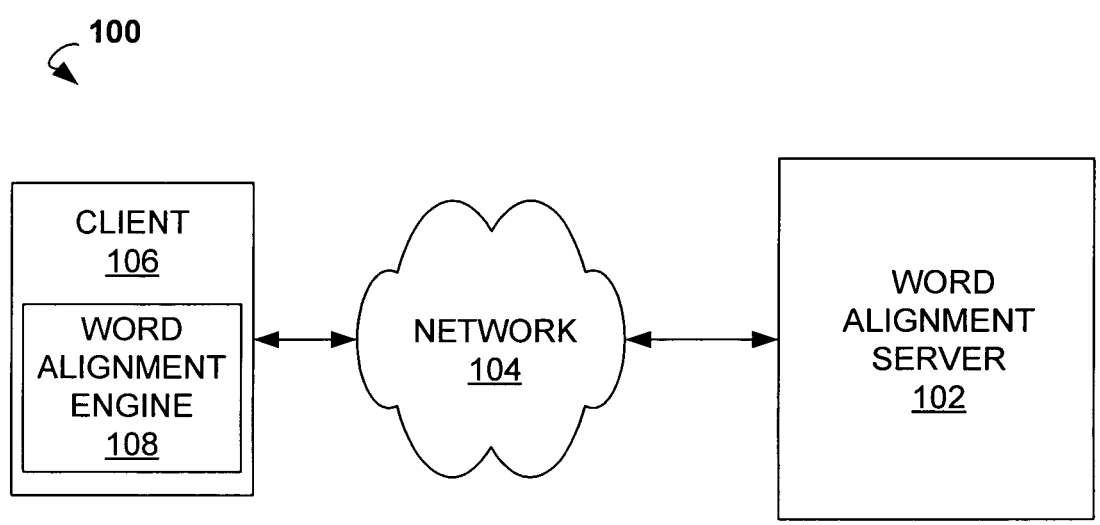
FIG. 1 illustrates an exemplary word alignment environment in which the invention may be practiced.

FIG. 1 illustrates an exemplary environment 100 in which word alignment may be performed. The environment 100 comprises a word alignment server 102, a network 104, and a client 106. The word alignment server 102 communicates with the client 106 via the network 104. The word alignment server 102 is configured to store a first corpus and a second corpus used to generate word alignments in the first corpus and may comprise a word alignment engine such as word alignment engine 108. The network 104 may comprise a public network (e.g., the Internet) or a private network. The client 106 may comprise storage, a display, a word alignment engine 108 and/or additional functionality not relevant to the scope of this implementation.

In operation, the client 106 accesses the first corpus and/or the second corpus in the word alignment server 102 via the network 104. The word alignment engine 108 processes the first corpus and the second corpus to generate word alignments in the first corpus. Additionally, the word alignment server 102 may receive generated word alignments from the client 106 via the network 104.

Figure 2:
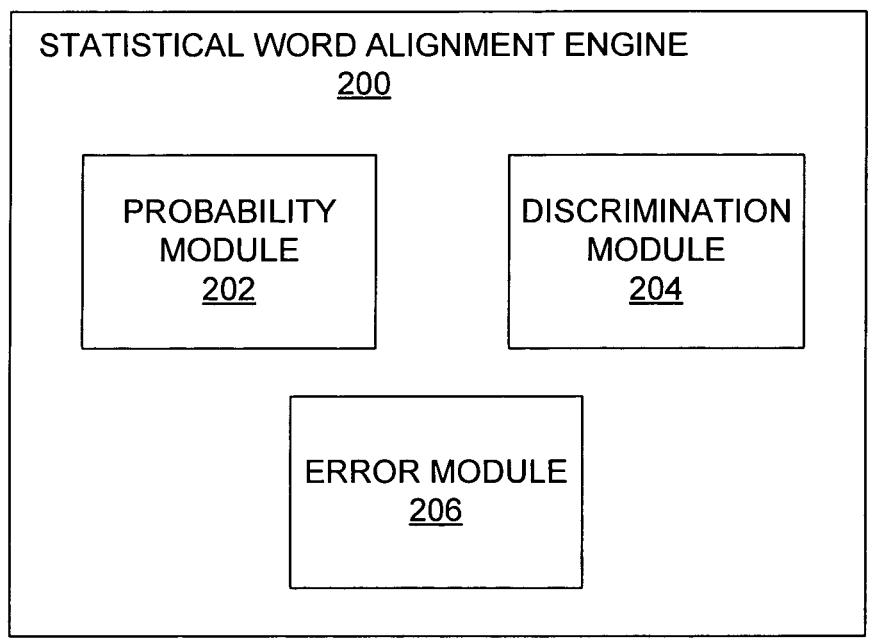
FIG. 2 illustrates a schematic diagram of an exemplary statistical word alignment engine.

FIG. 2 illustrates a schematic diagram of an exemplary statistical word alignment engine 200. The statistical word alignment engine 200 is configured to calculate statistical probabilities of word alignments in a first corpus, according to exemplary embodiments. The statistical word alignment engine 200 comprises a probability module 202, a discrimination module 204, and an error module 206. The probability module 202 is configured to calculate probabilities of word alignments and probability distributions of the word alignments for each sentence pair within a first corpus and to modify a model estimate.

The first corpus may comprise parallel segments. Parallel segments are translations of at least one segment in at least two languages. The parallel segments include "sentence pairs." Sentence pairs may comprise one or more sentences in a first translation that correspond to one or more sentences in a second translation. The first translation and/or the second translation, however, do not include word alignments, according to some embodiments. Word alignments comprise annotations indicating a correspondence of words and/or phrases in one language to words and/or phrases in another language. The first corpus may comprise millions of sentences.

The model estimate may comprise one or more sub-models. The sub-models can be utilized to calculate a probability of a word-to-word alignment or a word-to-phrase alignment. For example, a sub-model may indicate that if the first four letters of words in two translations match, a word alignment between these words is more probable than other possible word alignments. A second sub-model may indicate that the left-most words in a sentence pair are likely to result in an accurate word alignment.

The word alignments are based on a linear-logarithmic model, according to exemplary embodiments. The linear-logarithmic model may include at least five sub-models $h_m$ (e.g., IBM Model 4), for example. Each sub-model may have an associated weight $\lambda_m$. The probability, p, of a word alignment a, may be represented as:

$$p_\lambda(f, a | e) = \frac{\exp\left(\sum_i \lambda_i h_i(a, e, f)\right)}{\sum_{a',f'} \exp\left(\sum_i \lambda_i h_i(a', e, f')\right)}$$

where e and f are words. The best word alignment, â, of the words may be specified as:

$$\hat{a} = \arg\max_a \sum_i \lambda_i h_i(f, a, e)$$

where a is an alignment of words e and f. The probability module 202 calculates the probability distribution of the word alignments, a, generated according to the model estimate comprising the sub-models, $h_m$. The probability distribution may represent a specification of the probabilities, p, for each possible random word alignment, a.

After calculating the probability distribution throughout the first corpus, the probability module 202 modifies the model estimate according to the probability distribution. In alternative embodiments, the probability module 202 creates a new model estimate based on the probability distribution of the model estimate. For example, the probability module 202 may add or delete sub-models. The probability module 202 may additionally alter various parameters within the sub-models. For example, a modified sub-model may indicate that if the first five letters rather than the first four letters of words in two translations match, a word alignment between these words is more probable than other possible word alignments. Further, a second sub-model may indicate that the second from left-most words rather than the left-most words in a sentence pair are likely to result in an accurate word alignment.

The probability module 202 uses the sub-models in the model estimate to evaluate the suitability of a hypothesized alignment. The probability module 202 may, for example, compare a suitability of a first sub-model to a suitability of a second sub-model for each hypothesized word-level alignment. The probability module 202 may additionally determine an ability of the sub-models to discriminate between hypothesized word alignments.

The probability module 202 may modify the model estimate by adjusting a weighting factor of each of the sub-models within the model estimate. A weighting factor may comprise a multiplier indicating the likelihood that the sub-model will yield an accurate translation. For example, a first sub-model having a weighting factor of 0.85 is more likely to be accurate than a second sub-model having a weighting factor of 0.35. Because the weighting factor of the first sub-model is greater, the first sub-model is more favored during a second calculation of the probability distribution based on the modified model estimate.

The model estimate can also be modified by generating new sub-models, removing indiscriminative sub-models, and/or combining sub-models. For example, an indiscriminative sub-model may comprise a sub-model that has a low probability of generating an accurate word alignment. For example, a sub-model that is indiscriminative may specify that a first word in a first translation is likely to correspond to the last word of the source.

If the model estimate has been modified, the discrimination module 204 performs a discriminative process. The discriminative process steers the modification of the model estimate or corrects a new model estimate. To steer the model estimate, the discrimination module 204 generates an N-best list comprising sub-models and sub-model weights according to word alignment annotations within a second corpus.

The second corpus comprises a smaller set of parallel segments translated into the same two or more languages as the first corpus. The second corpus may comprise a section of the first corpus or the second corpus may be completely separate from the first corpus. The second corpus may include approximately one hundred to ten thousand sentence pairs. However, any number of sentence pairs may be included in the second corpus, according to some embodiments.

The sentence pairs in the second corpus include annotations to indicate word-to-word alignments and word-to-phrase alignments within each of the sentence pairs. The annotations may be generated by a human translator. The word alignments may be referred to as "gold standard word alignments." Alternatively, the annotations may be initially generated using SMT or any other automated process and corrected by a human translator.

Based on the annotations in the small corpus, the discrimination model creates an N-best list where "N" is a constant indicating the size of the list. The N-best list includes a specified number of sub-models that are each associated with a weighting factor based on the gold standard word alignments, discussed herein. After generating a list of sub-models based on the annotations within the second corpus, the discrimination module 204 removes sub-models or word alignments that have a weighting factor that is less than the weighting factor of N number of sub-models. For example, the constant N may be 128. The N-best list includes the 128 most heavily weighted sub-models derived from the annotations in the second corpus. In alternative implementations, the probability module 202 may generate the N-best list.

The discrimination module 204 may check whether the model estimate generated based on the first corpus has converged with the model estimate based on the second corpus. If these model estimates have converged such that there are no new N-best entries in the N-best list, the word alignment is complete.

If there are new N-best entries, the discrimination module 204 then enriches the model estimate generated by the probability module 202 based on the first corpus with the N-best list based on the second corpus. The enrichment adds the weighting factors in the N-best list based on the second corpus to the weighting factors in the model estimate based on the first corpus, compares the manual alignments to the hypothesized alignments, and weights one or more sub-models within the model estimate based on the first corpus according to the comparison. For example, a sub-model associated with a weighting factor of 0.15 in the model estimate may have a weighting factor of 0.45 in the N-best list. As a result of the enrichment, the sub-model may be re-weighted to a weight of 0.30. Having a higher weight, the sub-model is more likely to generate word alignments in a subsequent iteration. In this example, the weights are evenly weighted. However, in other embodiments, the weighting factor in the model estimate may be greater than the weight of the sub-model in the N-best list, and vice-versa.

To re-weight the model estimate, the discrimination module 204 compares the gold-standard word alignments to hypothesized word alignments in the first corpus. The hypothesized word alignments in the first corpus are the word alignments generated according to the model estimate. The discrimination module 204 compares the weighting factor of each sub-model to randomly generated weighting factors. In one implementation, the discrimination module 204 generates 999 weighting factors. To determine the best weighting factor for each sub-model in the model estimate, an error for each weighting factor is calculated.

A one-dimensional error minimization is performed on the selected weighting factor. The one-dimensional error-minimization is the weight that results in increased error reduction if the weights associated with the other sub-models are held constant. The one-dimensional error-minimization is repeated until there is no sub-model weight that can be modified to reduce error. The weighting factor with the lowest error is selected and a corresponding component of the sub-model weight vector may be modified. The discrimination module 204 repeats the discriminative step until substantially all of the hypotheses in the N-best list are in the model estimate. Other error-minimization methods, such as Powell's method, that are apparent to one skilled in the art may be used.

The error module 206 determines whether the model estimate has converged with the N-best list. The model estimate has converged if the error was not decreased from a previous iteration. If there is no convergence, the error module 206 instructs the probability module 202 to perform another iteration comprising calculating a second probability distribution, creating a second modified model estimate, and/or performing the discriminative step. The error module 206 may additionally transmit a command to display and/or record the word alignments generated by the model estimate or a final version of the model estimate. The F-measure is used to measure the error of the word alignments using the value 1—F-measure. The F-measure may be calculated as:

$$F(A, S, \alpha) = \frac{1}{\frac{\alpha}{\text{precision}(A, S)} + \frac{(1-\alpha)}{\text{recall}(A, S)}}$$

where $\alpha$ is a relative weighting ratio of the recall value to the precision value.

In alternative embodiments, the error module 206 may determine a finite number of iterations to perform. In these embodiments, the error module 206 may not calculate the F-measure. For example, if the model estimate typically converges at iteration number ten, the error module may perform subsequent word alignments according to a default of ten iterations. Although various modules are illustrated as comprising the statistical word alignment engine 200 in FIG. 2, fewer or more modules may comprise the statistical word alignment engine 200 and still fall within the scope of various embodiments.

Figure 3:
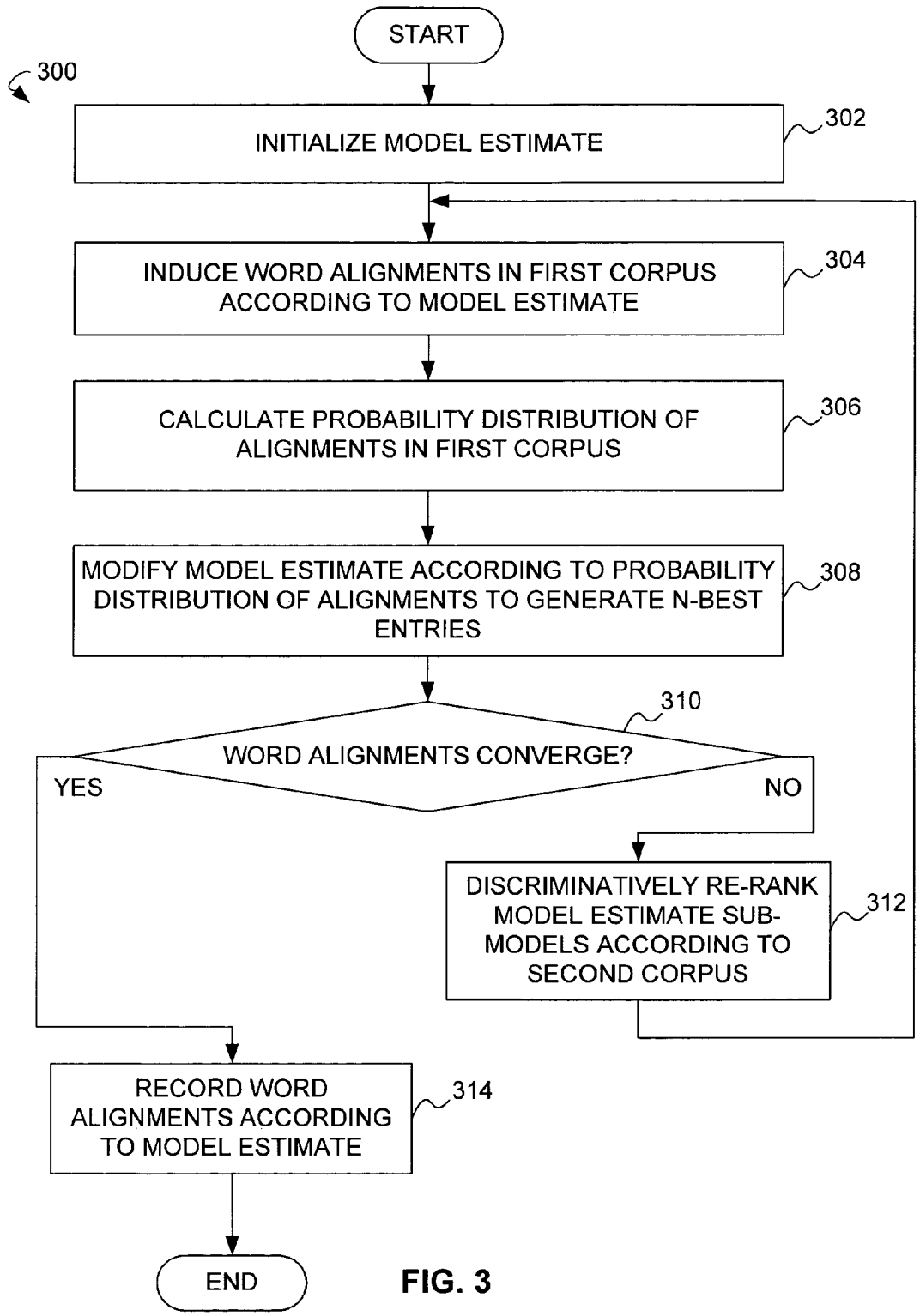
FIG. 3 illustrates a flowchart showing an exemplary process for word alignment.

FIG. 3 illustrates a flowchart showing an exemplary process 300 for word alignment. In some embodiments, the exemplary process 300 may be implemented as a computer program embodied on a computer-readable medium having instructions comprising the exemplary process 300. In each of the iterations of the process 300 for word alignment, the discriminative step steers the model estimate to produce a more accurate model estimate and, therefore, determines more accurate word alignments in the first corpus. The process 300 may comprise step 302, initializing the model estimate; step 304, inducing word alignments in a first corpus according to the model estimate; step 306, calculating a probability distribution of all word alignments in the first corpus; step 308, replacing the model estimate according to a probability distribution of the word alignments to generate an N-best list; step 310, determining whether the word alignments have converged; step 312, using a second corpus to discriminatively re-rank the model estimate if the word alignments have not converged; and step 314, if the word alignments have converged, recording the word alignments generated by the model estimate. However, fewer or more steps may comprise the process 300 and still fall within the scope of various embodiments.

Step 302 includes initializing the model estimate that induces word alignments in the first corpus. The initial model estimate may comprise an assumption that all translations are equally probable. In alternative embodiments, the initial model estimate may comprise one or more default sub-models associated with one or more default weightings.

Step 304 includes inducing word alignments in the first corpus. The word alignments are induced according to the sub-models within the model estimate. In the initial inducing step using the initial model estimate, the sub-models may be equally weighted.

Step 306 includes calculating the probability distribution of all or substantially all of the induced word alignments in the first corpus. The probability distribution indicates the likelihood of each induced word alignment according to the model estimate. Based on the probability distribution associated with the first corpus, the sub-models having a higher probability will be assigned a higher weighting factor than the less probable sub-models in the model estimate.

In step 308, according to the probability distribution of the first corpus, a new model estimate replaces the former model estimate. In some embodiments, the former model estimate may be simply modified by, for example, changing a weighting factor of a sub-model within the model estimate. In some embodiments, Viterbi training may approximate the hypothesized word alignments to update the new model estimate using an assumed word alignment.

Step 310 includes determining whether the hypothesized word alignments in the first corpus have converged. Convergence occurs if there are no new N-best entries in the modified model estimate. If the hypothesized word alignments have not converged, the process 300 continues to step 312. In alternative embodiments, step 310 may comprise determining whether a default number of iterations have been performed.

In step 312, the sub-models within the model estimate are re-ranked using the small corpus of annotated parallel segments. The sub-models are re-ranked by modifying the weighting factors associated with each sub-model. This process is discussed in greater detail in connection with FIG. 2 and FIG. 4.

If the word alignments have converged in step 310 or if the default number of iterations has been performed, the process 300 continues to step 314. Step 314 includes recording the word alignments in the first corpus. The word alignments may be recorded in an electronic media such as ROM, a hard disk, or similar media.

Figure 4:
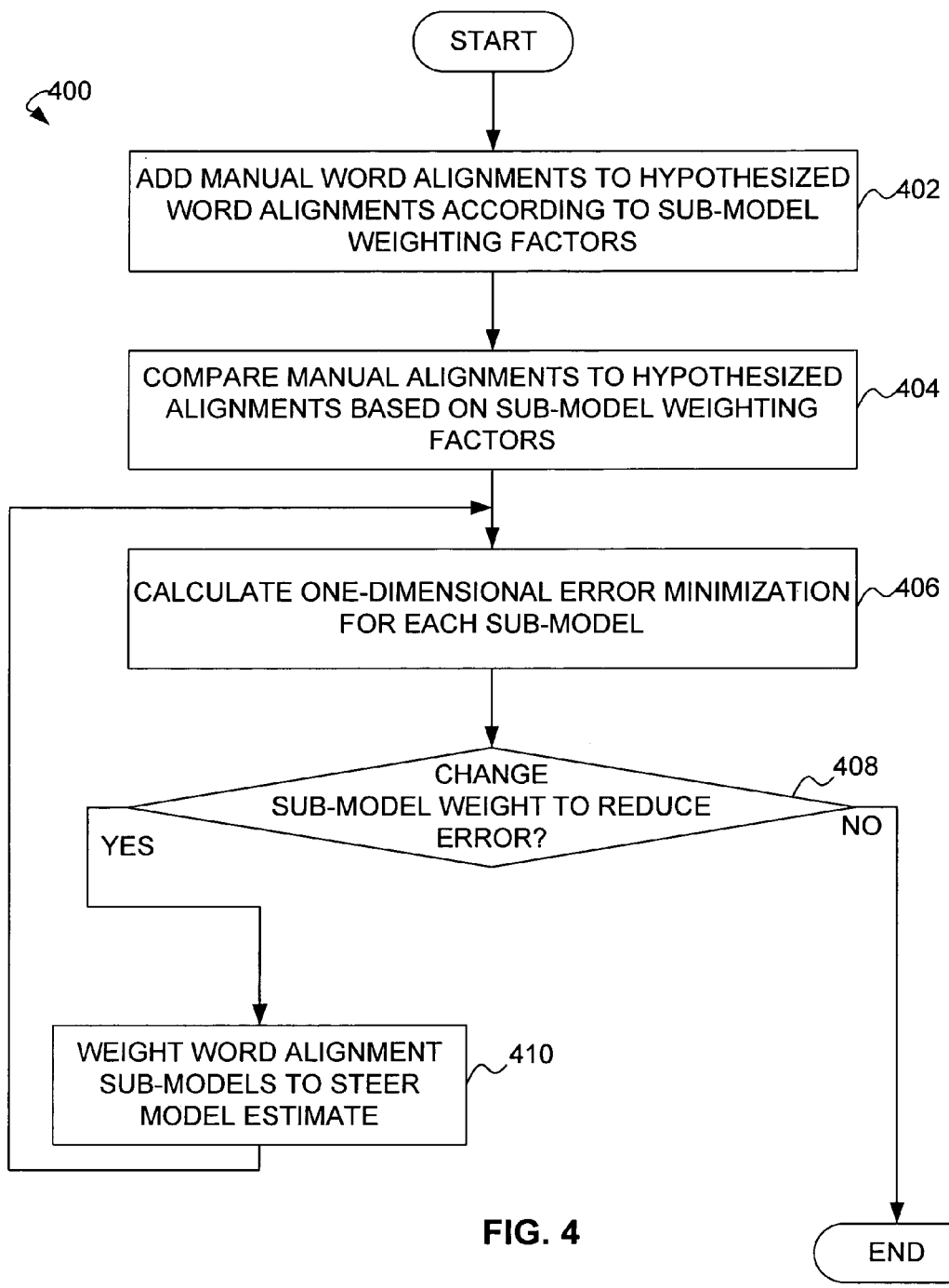
FIG. 4 illustrates a flow chart showing an exemplary process for discriminatively re-ranking the model estimate.

FIG. 4 illustrates a flow chart showing an exemplary process 400 for discriminatively re-ranking the model estimate. The discrimination module 204 in the statistical word alignment engine 200 may perform the process 400, for example. Discriminatively re-ranking the model estimate associated with the first corpus in each of the iterations improves word alignment in a first corpus by steering the weighting of the sub-models towards the manual word alignments.

In step 402, manual word alignments within the second corpus are added to the hypothesized word alignments within the first corpus according to sub-model weighting factors. More specifically, the model estimate derived from the first corpus comprises at least one sub-model that is associated with a weighting factor. The sub-models in the N-best list associated with the first corpus correspond to one or more weighted sub-models within an N-best list associated with the second corpus. The weighting factor of each sub-model within the N-best list associated with the first corpus is processed with the weighting factor in the N-best list associated with the second corpus to generate an updated weighting factor.

In step 404, to compare the manual word alignments in the second corpus to the hypothesized word alignments in the first corpus, the updated weighting factor for each sub-model derived using the first corpus is compared to randomly generated weighting factors. The weighting factor that generates the least amount of error is selected. By comparing the weighting factors of the sub-models, the accuracy of the word alignments generated by those sub-models is also compared. If the weighting factors associated with the sub-models have a smaller amount of error, the model estimate associated with the first corpus will produce more accurate word alignments because the model estimate associated with the first corpus is more likely to apply an accurate sub-model when performing each word alignment within the first corpus.

In step 406, weighting the one or more sub-models according to the comparison, the selected weighting factor is further refined using a one-dimensional error minimization until there is no further error reduction. An example of a one-dimensional error minimization algorithm includes calculating a piecewise constant function which evaluates the error of the word alignments which are selected by the "best word alignment", â, equation if all weights associated with the sub-models remain constant except for the weight of the sub-model on which the error is evaluated.

In step 408, determining whether to change a weight associated with a sub-model to reduce error, a weighting factor associated with one or more of the sub-models may be selected. The selected weighting factors are modified to reduce overall error generated by the N-best list associated with the first corpus. If no further error reduction is possible by adjusting the weighting factors, the process returns to step 312, depicted in FIG. 3.

In step 410, re-weighting word alignment sub-models to steer model estimate associated with the first corpus, the weighting factor is associated with the sub-model in the model estimate is modified to decrease word alignment error in the first corpus. In some embodiments, a component of the sub-model weight may be updated. The new weighting factor for each sub-model within the model estimate re-ranks the model estimate. If the weighting factor is selected, the process 400 returns to step 406 to further refine the new weighting factor until there is substantially no further error reduction.

While various embodiments have been described above, it should be understood that they have been presented by way of example only, and not limitation. For example, any of the elements associated with the statistical word alignment engine 200 may employ any of the desired functionality set forth hereinabove. Thus, the breadth and scope of a preferred embodiment should not be limited by any of the above-described exemplary embodiments.

What is claimed is:

1. A method for aligning words in parallel segments, the method comprising:
    calculating a first probability distribution, utilizing a processor and a memory, according to a model estimate of word alignments within a first corpus comprising word-level unaligned parallel segments, the model estimate comprising an N-best list of one or more sub-models;
    modifying the model estimate according to the first probability distribution;
    discriminatively re-ranking one or more sub-models associated with the modified model estimate according to word-level annotated parallel segments; and
    calculating a second probability distribution of the word alignments within the first corpus according to the re-ranked sub-models associated with the modified model estimate;
    wherein discriminatively re-ranking one or more sub-models within the modified model estimate according to manual alignments further comprises:
    adding manual alignments to hypothesized alignments within the first corpus;
    comparing the manual alignments to the hypothesized alignments; and
    weighting the one or more sub-models according to the comparison; and
    wherein the comparing of the manual alignments to the hypothesized alignments comprises:
    comparing an updated weighting factor for each sub-model derived using the first corpus to randomly generated weighting factors; and
    selecting one of the updated weighting factor and the randomly generated weighting factor that generates a least amount of error.

2. The method recited in claim 1, wherein the word-level annotated parallel segments comprise annotations indicating manual alignments.

3. The method recited in claim 1, further comprising determining whether a first error associated with the re-ranked modified model estimate converges with a second error associated with the model estimate.

4. The method recited in claim 1, further comprising determining a number of iterations to perform, the iterations comprising the steps of:
calculating a third probability distribution according to the re-ranked modified model estimate within the first corpus;
further modifying the re-ranked modified model estimate according to the third probability distribution; and
further discriminatively re-ranking one or more sub-models associated with the re-ranked modified model estimate according to the word-level annotated parallel segments.

5. The method recited in claim 1, wherein the first corpus is larger than a second corpus.

6. The method recited in claim 1, further comprising initializing the model estimate.

7. The method recited in claim 1, wherein:
the weighting of the one or more sub-models according to the comparison is according to at least one weighting factor; and
the discriminative re-ranking of the one or more sub-models within the modified model estimate according to manual alignments further comprises refining at least one of the at least one weighting factors using a one-dimensional error minimization until there is no further error reduction.

8. The method recited in claim 7, wherein the refining of the at least one weighting factor further comprises calculating a piecewise constant function that evaluates an error of the word alignments selected by a best word alignment equation keeping the at least one weighting factor for each of the one or more sub-models constant except for one of the at least one weighting factor for the sub-model being evaluated.

9. A computer program embodied on a non-transitory computer readable medium having instructions for aligning words in parallel segments comprising:
calculating a first probability distribution of word alignments within a first corpus comprising unaligned parallel segments according to a model estimate, the model estimate comprising an N-best list of one or more sub-models;
modifying the model estimate according to the probability distribution;
discriminatively re-ranking one or more sub-models within the modified model estimate according to annotated parallel segments; and
calculating a second probability distribution of the word alignments within the first corpus according to the re-ranked modified model estimate;
wherein discriminatively re-ranking one or more sub-models within the modified model estimate according to manual alignments further comprises:
adding manual alignments to hypothesized alignments within the first corpus;
comparing the manual alignments to the hypothesized alignments; and
weighting the one or more sub-models according to the comparison;
wherein:
the weighting of the one or more sub-models according to the comparison is according to at least one weighting factor; and
the discriminative re-ranking of the one or more sub-models within the modified model estimate according to manual alignments further comprises refining at least one of the at least one weighting factors using a one-dimensional error minimization until there is no further error reduction; and
wherein the refining of the at least one weighting factor further comprises calculating a piecewise constant function that evaluates an error of the word alignments selected by a best word alignment equation keeping the at least one weighting factor for each of the one or more sub-models constant except for one of the at least one weighting factor for the sub-model being evaluated.

10. The computer program recited in claim 9, wherein the annotated parallel segments comprise annotations indicating manual alignments.

11. The computer program recited in claim 9, further comprising an instruction for determining whether a first error due to the re-ranked modified model estimate converges with a second error due to the model estimate.

12. The computer program recited in claim 9, further comprising an instruction for determining a number of iterations to perform, the iterations comprising the steps of:
calculating a third probability distribution according to the re-ranked modified model estimate within the first corpus;
further modifying the re-ranked modified model estimate according to the third probability distribution; and
further discriminatively re-ranking one or more sub-models associated with the re-ranked modified model estimate according to the word-level annotated parallel segments.

13. The computer program recited in claim 9, wherein the first corpus is larger than a second corpus.

14. The computer program recited in claim 9, further comprising an instruction for initializing the model estimate.

* * * * *